United States Patent
Choi et al.

(10) Patent No.: US 12,360,524 B2
(45) Date of Patent: *Jul. 15, 2025

(54) ROBOTIC LAWN MOWERS

(71) Applicant: TECHTRONIC CORDLESS GP, Anderson, SC (US)

(72) Inventors: Man Ho Choi, Kwai Chung (CN); Hei Man Lee, Kwai Chung (CN); Shing Hin Li, Kwai Chung (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/984,038

(22) Filed: Nov. 9, 2022

(65) Prior Publication Data

US 2023/0141983 A1    May 11, 2023

Related U.S. Application Data

(60) Provisional application No. 63/278,077, filed on Nov. 10, 2021.

(51) Int. Cl.
*A01D 34/00* (2006.01)
*G05D 1/00* (2006.01)

(52) U.S. Cl.
CPC ......... *G05D 1/0027* (2013.01); *A01D 34/008* (2013.01); *G05D 1/0022* (2013.01); *A01D 34/00* (2013.01)

(58) Field of Classification Search
CPC .. G05D 1/0027; G05D 1/0022; G05D 1/0297; A01D 34/008; A01D 34/00; H04L 67/104; H04W 4/38; H04W 8/00; H04W 76/00
See application file for complete search history.

(56) References Cited

U.S. PATENT DOCUMENTS

| | | |
|---|---|---|
| 2017/0364091 A1 | 12/2017 | Bennett et al. |
| 2018/0348748 A1 | 12/2018 | Dowlatkhah et al. |
| 2018/0353040 A1 | 12/2018 | Matt et al. |
| 2019/0152340 A1 | 5/2019 | Haneda |

(Continued)

FOREIGN PATENT DOCUMENTS

| | | |
|---|---|---|
| CN | 108521974 A | * 9/2018 |
| CN | 108919814 A | 11/2018 |

(Continued)

OTHER PUBLICATIONS

Li B. et al: "Development and Testing of a Two-UAV Communication Relay System—PMC" MDPI sensors, Oct. 13, 2016 (Oct. 13, 2016), pp. 1-29, XP093029112, Retrieved from the Internet: URL: https://www.ncbi.nlm.nih.gov/pmc/articles/PMC5087484/ [retrieved on Mar. 6, 2023].

(Continued)

*Primary Examiner* — Justin Holmes
(74) *Attorney, Agent, or Firm* — Dority & Manning, P.A.

(57) ABSTRACT

A mowing system including a base station disposed at a work area; and a plurality of robotic lawn mowers disposed at the work area, the plurality of robotic lawn mowers including a first robotic lawn mower and a second robotic lawn mower, wherein the base station is configured to communicate with the second robotic lawn mower through the first robotic lawn mower.

26 Claims, 7 Drawing Sheets

(56) References Cited

U.S. PATENT DOCUMENTS

| | | | |
|---|---|---|---|
| 2019/0163175 A1 | 5/2019 | Ko et al. | |
| 2019/0346848 A1 | 11/2019 | Zhou et al. | |
| 2020/0023511 A1* | 1/2020 | Lee | A47L 9/2857 |
| 2021/0089040 A1 | 3/2021 | Ebrahimi Afrouzi et al. | |
| 2021/0286376 A1 | 9/2021 | Takahashi et al. | |
| 2023/0142590 A1* | 5/2023 | Choi | G05D 1/0027 |
| | | | 701/2 |
| 2024/0345599 A1* | 10/2024 | Jonsson | G05D 1/0295 |

FOREIGN PATENT DOCUMENTS

| | | |
|---|---|---|
| DE | 202013101894 U1 | 8/2014 |
| EP | 2870852 A1 | 5/2015 |
| EP | 3698620 A1 | 8/2020 |

OTHER PUBLICATIONS

Dynia Miroslaw et al: "Maintaining Communication Between an Explorer and a Base Station" In: "IFIP. International Federation for Information Processing", Dec. 31, 2006 (Dec. 31, 2006), XP093029044, ISSN: 1571-5736 vol. 216, pp. 137-146, DOI: 10.1007/978-0-387-34733-2_14.

European Search Report Corresponding with Application No. EP22206778 on Mar. 7, 2023 (3 pages).

European Search Report Corresponding with Application No. EP22206349 on Mar. 7, 2023 (3 pages).

European Office Action Corresponding to U.S. Appl. No. 22/206,349 on Sep. 19, 2024.

European Office Action Corresponding to U.S. Appl. No. 22/206,778 on Oct. 22, 2024.

\* cited by examiner

ROBOTIC LAWN MOWERS

CROSS-REFERENCE TO RELATED APPLICATIONS

The present application claims priority to U.S. Provisional Patent Application 63/278,077 filed on Nov. 10, 2021, the disclosure of which is incorporated by reference herein in its entirety.

FIELD

The present disclosure relates generally to robotic lawn mowers, and more particularly to communication between and amongst a plurality of robotic lawn mowers

BACKGROUND

Traditionally, lawn mowing was performed by a human operator. The operator moved a lawn mowing machine around a work area. Over time, it has become common to replace the human operator with a robotic lawn mower. Robotic lawn mowers are capable of mowing operations largely without the intervention of operators. In this regard, they reduce time and cost associated with mowing. However, robotic lawn mowers are limited in their mowing capacity as they generally lack effective communication for operating in a group.

Accordingly, improved mowing systems which utilize a plurality of robotic lawn mowers would be desired in the art. In particular, mowing systems which allow a plurality of robotic lawn mowers to effectively communicate with one another would be advantageous.

SUMMARY

Aspects and advantages of the present disclosure will be set forth in part in the following description, or may be obvious from the description, or may be learned through practice of the technology.

In accordance with one embodiment, a mowing system is provided. The mowing system includes a base station disposed at a work area; and a plurality of robotic lawn mowers disposed at the work area, the plurality of robotic lawn mowers including a first robotic lawn mower and a second robotic lawn mower, wherein the base station is configured to communicate with the second robotic lawn mower through the first robotic lawn mower.

In accordance with another embodiment, a mowing system is provided. The mowing system includes a base station disposed at a work area; and a plurality of robotic lawn mowers disposed at the work area, the plurality of robotic lawn mowers including a first robotic lawn mower and a second robotic lawn mower arranged in a hierarchical schema In accordance with another embodiment, a method of operating a mowing system is provided. The method includes providing a plurality of robotic lawn mowers at a work area, the plurality of robotic lawn mowers including a first robotic lawn mower and a second robotic lawn mower; communicating command instructions from a base station of the mowing system to the first robotic lawn mower; and communicating at least a portion of the command instructions from the first robotic lawn mower to the second robotic lawn mower.

These and other features, aspects and advantages of the present disclosure will become better understood with reference to the following description and appended claims. The accompanying drawings, which are incorporated in and constitute a part of this specification, illustrate embodiments of the technology and, together with the description, serve to explain the principles of the technology.

Other aspects of the embodiments will become apparent by consideration of the detailed description and accompanying drawings.

BRIEF DESCRIPTION OF THE DRAWINGS

A full and enabling disclosure of the present disclosure, including the best mode of making and using the present systems and methods, directed to one of ordinary skill in the art, is set forth in the specification, which makes reference to the appended figures, in which.

DETAILED DESCRIPTION

Figure 1:
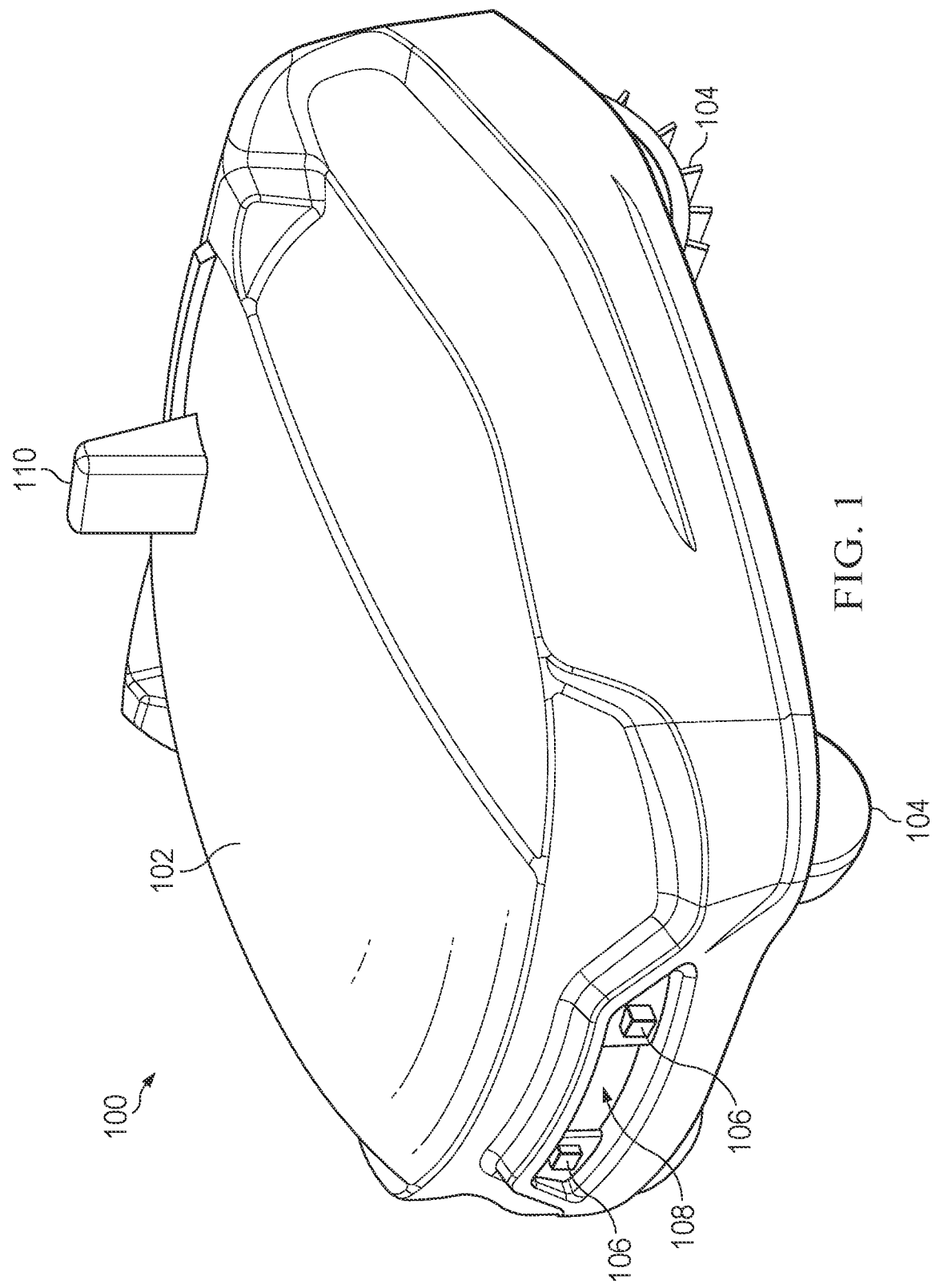
FIG. 1 is a perspective view of a robotic lawn mower in accordance with an exemplary embodiment of the present disclosure.

Reference now will be made in detail to embodiments of the present disclosure, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, mowing systems and methods in accordance with embodiments described herein can provide hierarchical schemas for a plurality of robotic lawn mowers operating at a work area. These hierarchical schemas can dictate interactions between and amongst the robotic lawn mowers, or at least some of the robotic lawn mowers in the mowing system. In an embodiment, systems and methods described herein can assign principal responsibilities to one or more of the robotic lawn mowers while designating other robotic lawn mowers of the plurality of robotic lawn mowers as secondary to the principal robotic lawn mower(s).

By way of non-limiting example, the principal robotic lawn mower(s) can communicate between a base station, which may be disposed at the work area, and the secondary robotic lawn mower(s), acting, e.g., like a middleman between the base station and the secondary robotic lawn mower(s); assigning action items and protocols to the secondary robotic lawn mower(s); delegating responsibilities to the secondary robotic lawn mower(s); relaying information from the secondary robotic lawn mower(s) to the base station or between secondary robotic lawn mowers; storing (or even processing) information associated with one or more of the secondary robotic lawn mower(s); handling disagreements or issues arising between multiple secondary robotic lawn mowers; observing (and optionally documenting) actions taken by the secondary robotic lawn mower(s); or the like.

In certain instances, the principal and secondary robotic lawn mowers can be fungible, i.e., include the same hardware and components as one another. In this regard, hierarchical assignment may be designated without deference to structural, hardware, or even software differentiation between the robotic lawn mowers. In such a manner, the principal/secondary hierarchical arrangement may be rearrangeable in response to an operational event. For example, when the principal robotic lawn mower is operating at a sub-threshold charge level, principal status can be delegated to one of the secondary robotic lawn mowers. In certain instances, this designation can be temporarily assigned until the previous principal robotic lawn mower reaches a desired charge, at which time the principal designation can revert to the previous principal robotic lawn mower. In other instances, this designation can remain until such time that the newly appointed principal robotic lawn mower requires charging or another operational event occurs.

Using hierarchical schemas, the mowing system can streamline operation of a plurality of robotic lawn mowers without requiring human interaction. In certain instances, machine learning may be implemented to acquire information about the mowing system and improve operational capacity. Machine learning may happen centrally, e.g., at the principal robotic lawn mower or base station, or be decentralized, e.g., split between two or more of the robotic lawn mowers or between one of the robotic lawn mowers and the base station.

These and other features of the mowing systems and methods described herein will become apparent in light of the embodiments that follow.

FIG. 1 illustrates a view of an exemplary robotic lawn mower 100 as seen in accordance with an exemplary embodiment of the present disclosure. The mower 100 is autonomous, or at least semi-autonomous. The mower 100 can be utilized within a work area to perform a work operation, such as mow grass within the work area, perform trimming operations within the work area, perform hedging operations in the work area, or the like. The mower 100 can generally include a body 102 and a walking element including, e.g., a plurality of wheels 104 coupled to the body 102.

In an embodiment, the mower 100 can further include one or more sensors 106 which can detect an aspect of the mower 100 itself or the surrounding environment. In the depicted embodiment, the sensors 106 are disposed on an outer surface of the body 102. In another embodiment, the sensors 106 may be disposed under the body 102. In another embodiment, the sensors 106 may be exposed, e.g., at one or more openings 108 in the body 102. By way of non-limiting example, the sensors 106 may include one or more of visual sensors, audio sensors, touch sensors such as capacitive sensors, radar sensors, temperature sensors, or the like.

In an embodiment, the mower 100 can include a communication element 110. The communication element 110 can include a wireless communication device. The communication element 110 can communicate with other wireless communication devices, such as other wireless communication devices disposed nearby, such as other wireless communication devices disposed within the work area. While depicted on an exterior portion of the mower 100, in accordance with an embodiment, at least a portion of the communication element 110, such as the entire communication element 110, can be disposed at least partially within the body 102 of the mower 100.

Figure 2:
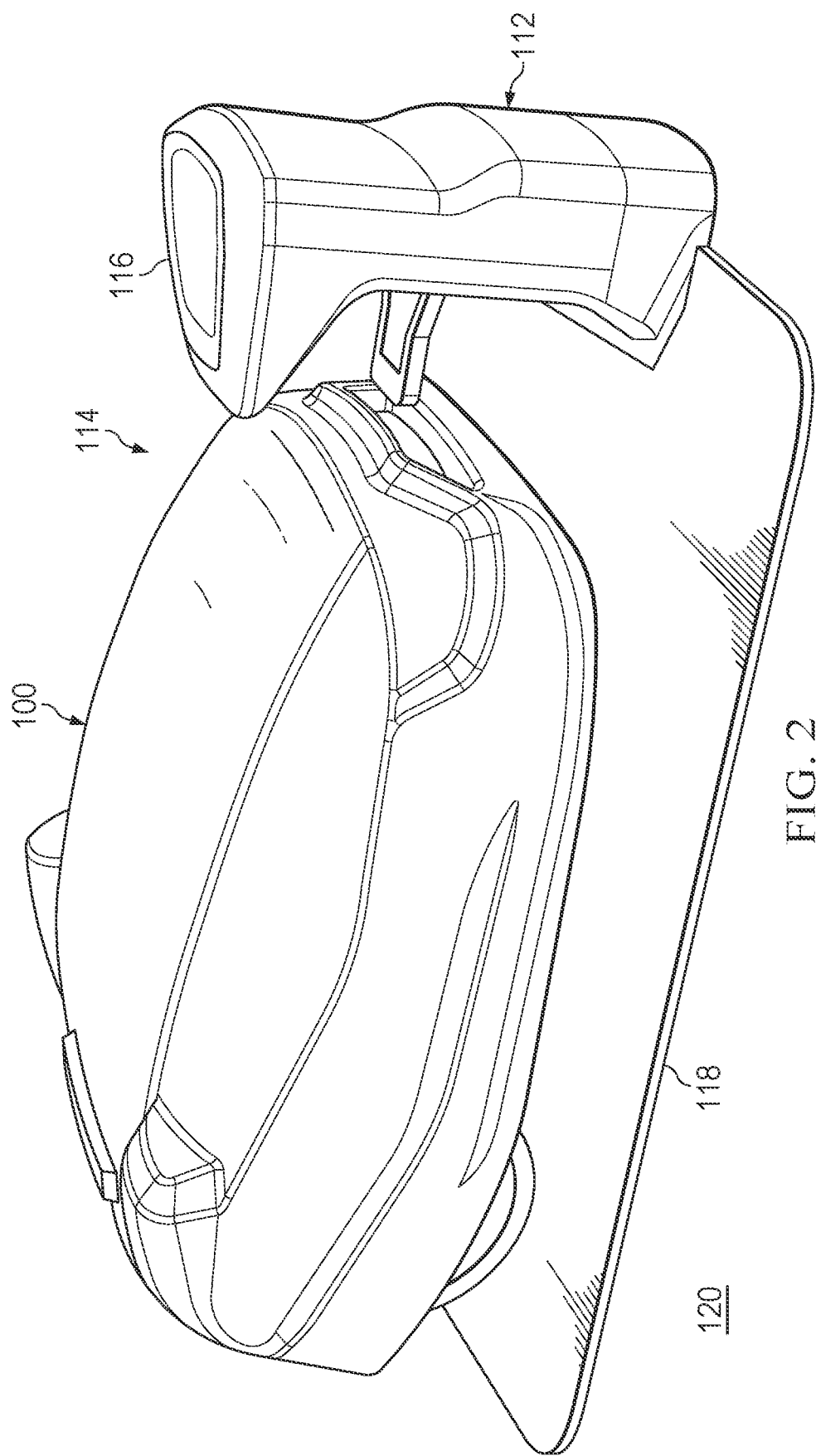
FIG. 2 is a perspective view of a mowing system including the robotic lawn mower and a base station in accordance with an exemplary embodiment of the present disclosure.

FIG. 2 depicts an exemplary embodiment of the mower 100 at a base station 112. The base station 112 can generally include a receiving area 114 and a dock 116 which can interface with the mower 100. In the depicted embodiment, the receiving area 114 includes a plate 118 upon which the mower 100 can reside when interfaced with the dock 116. In other embodiments, the receiving area 114 can be a portion of a work area 120 in the surrounding environment (i.e., without the plate 118).

One or more base stations 112 can be disposed within or near the work area 120. In certain instances, the base station(s) 112 may be disposed near a perimeter of the work area 120 to allow for electrical connectivity.

Figure 3:
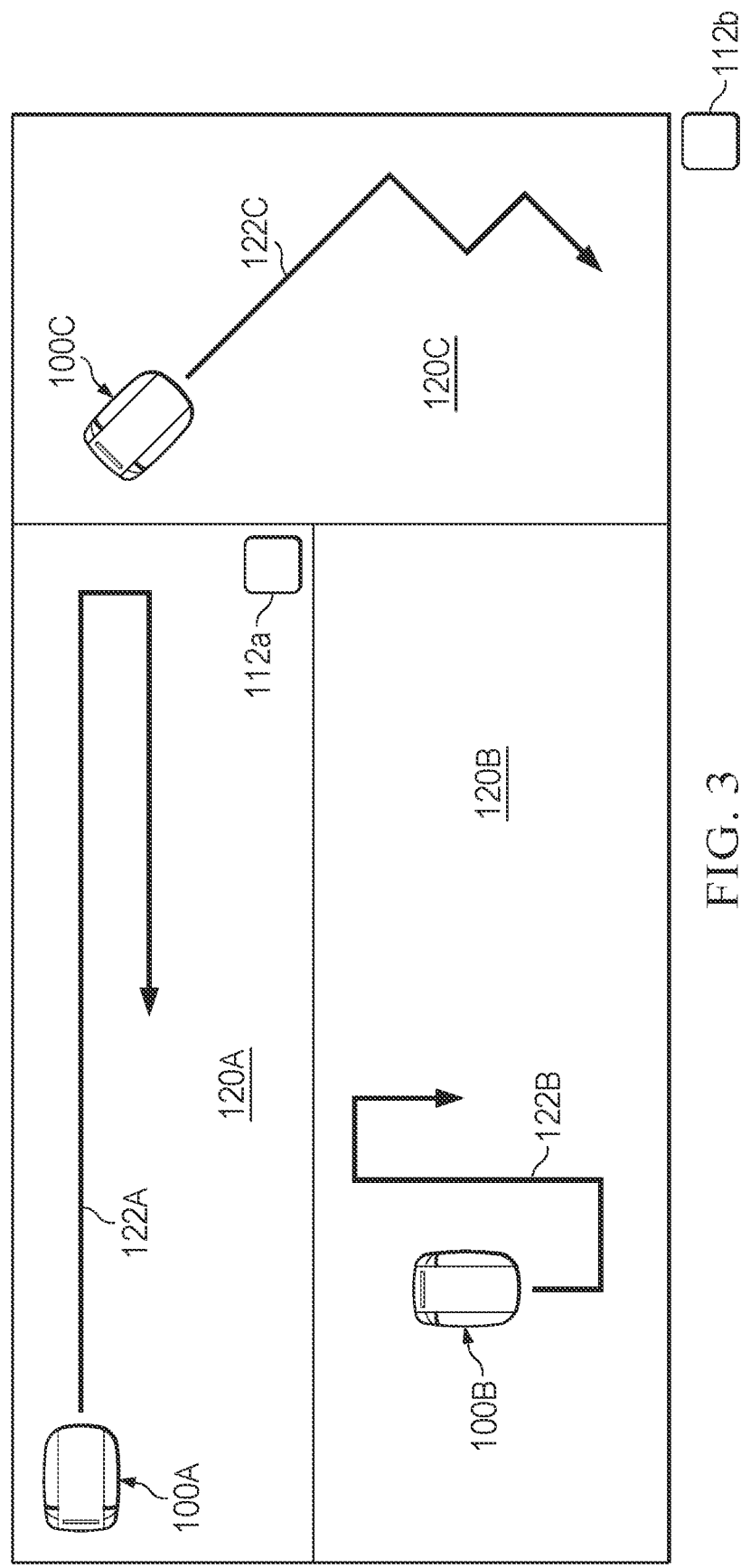
FIG. 3 is a schematic of a work area including a plurality of zones in accordance with an exemplary embodiment of the present disclosure.

FIG. 3 illustrates an exemplary work area 120 including three different zones—a first zone 120A, a second zone 120B, and a third zone 120C. It should be understood that the number, size and shape of the zones 120A, 120B, and 120C can vary without departing from the scope of this disclosure. A first mower 100A can be disposed in a first zone 120A, a second mower 100B can be disposed in a second zone 120B, and a third mower 100C can be disposed in a third zone 120C. In certain instances, the first, second, and third mowers, 100A, 100B, and 100C can generally remain in their respective zones and perform work operations therein. The first mower 100A can be performing an operation, e.g., a mowing operation, while travelling along path 122A. The second mower 100B can be performing a same or different operation while travelling along path 122B. The third mower 100 an also be performing a same or different operation while travelling along path 122C.

A first base station 112*a* and a second base station 112*b* can be disposed at the work area 120. The first base station 112*a* is depicted in the first zone 120A and the second base station 112*b* is disposed outside of zones 120A, 120B, and 120C but within the surrounding environment. As all three mowers 100A, 100B, and 100C require energy (e.g., recharging), it will be necessary for at least the second and third mowers 100B and 100C to leave their respective zones 120B and 120C to restore energy levels, e.g., charge. Even the first mower 100A may not necessarily charge at the base station 112A despite the base station 112A being disposed in the first zone 120A with the first mower 100A.

Figure 4:
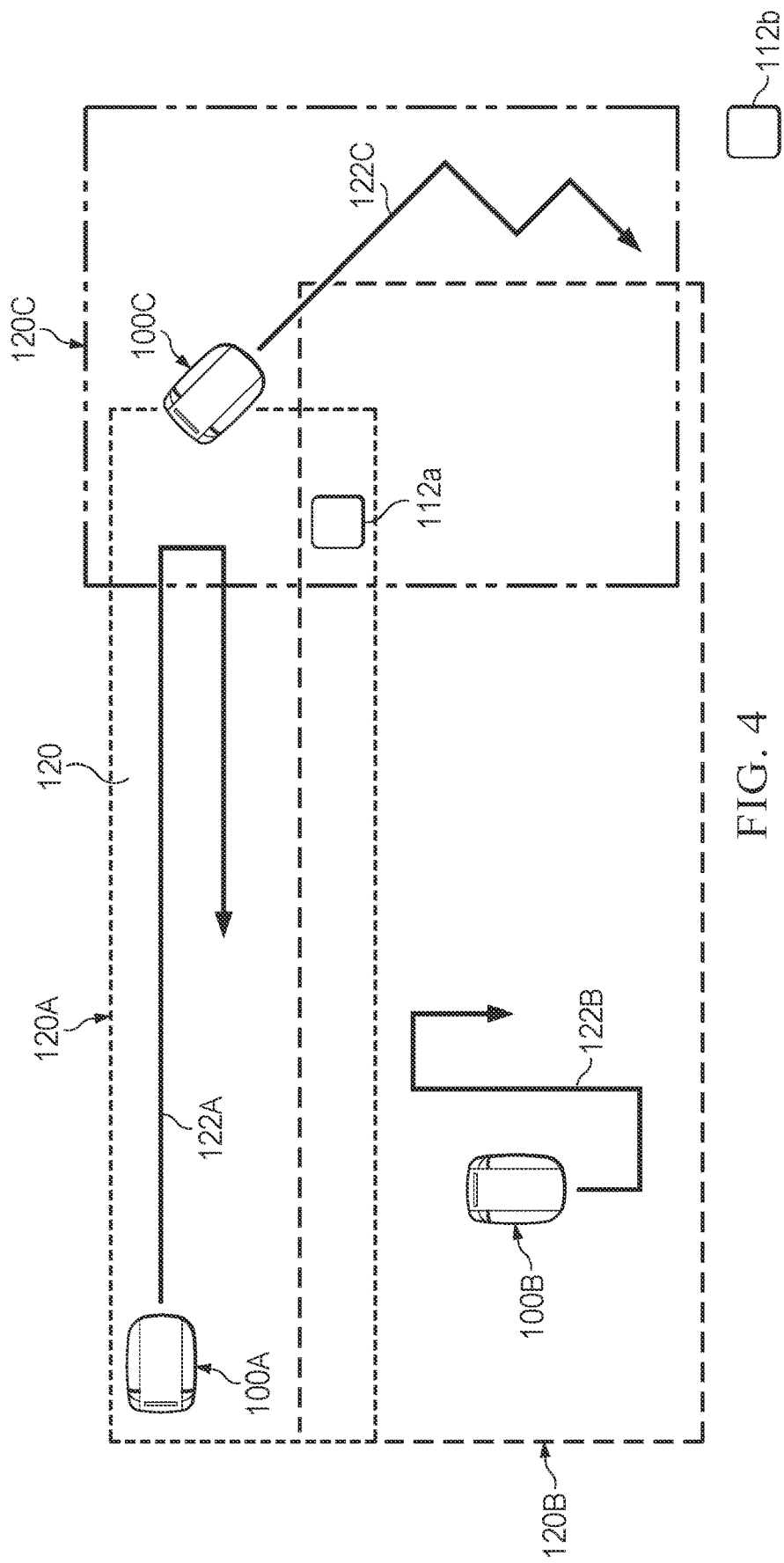
FIG. 4 is a schematic of a work area including a plurality of zones in accordance with an exemplary embodiment of the present disclosure.

FIG. 4 illustrates another exemplary work area 120 including three zones—a first zone 120A, a second zone 120B, and a third zone 120C. However, unlike the work area 120 depicted in FIG. 3, the work area 120 depicted in FIG. 4 includes overlapping zones 120A, 120B, and 120C. While only small portion of the zones 120A, 120B, and 120C are shown overlapping, in other embodiments the degree of overlap can be substantially larger. For example, in a particular embodiment the overlap between the zones 120A, 120B, and 120C can be approximately 100%, or even 100%. In an embodiment, the zones 120A, 120B, and 120C can overlap at differing degrees. For instance, by way of non-limiting example, 20% of the first zone 120A may overlap the second zone 120B while 40% of the first zone 120A may overlap the third zone 120C. By way of another example, 15% of the first zone 120A can overlap each of the second and third zones 120B and 120C, 10% of the second zone 120B can overlap the first zone 120A, and 50% of the third zone 120C can overlap the first zone 120A. In an embodiment, two of the zones may not overlap while two of the other zones overlap. Further scenarios are possible.

Similar to the embodiment depicted in FIG. 3, the first mower 100A is disposed in the first zone 120A, the second mower 100B is disposed in the second zone 120B, and the third mower 100C is disposed in the third zone 120C of the work area 120. However, given that the zones 120A, 120B, and 120C overlap, the first, second, and third mowers 100A, 100B, and 100C are thus operating in potentially conflicting environments where two or more of the robots might interact with one another or even collide. Hierarchical schemas may prevent these problems.

Figure 5:
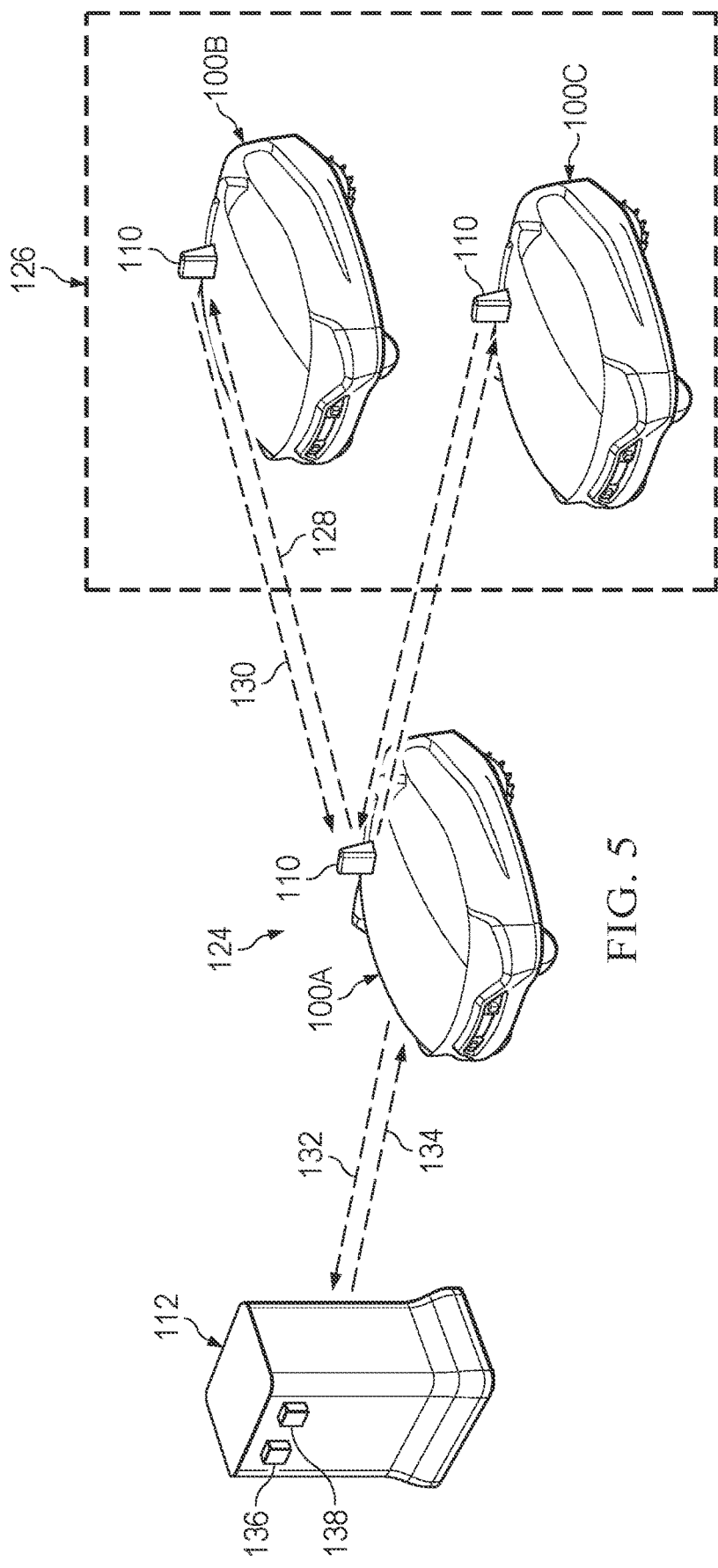
FIG. 5 is a schematic view of a hierarchical schema for a mowing system including a base station, a principal robotic lawn mower, and secondary robotic lawn mowers in accordance with an exemplary embodiment of the present disclosure.

Referring to FIG. 5, a schematic of an exemplary hierarchical schema is depicted. The hierarchical schema can include one or more principal mowers 124 and one or more secondary mowers 126. In the depicted embodiment, the one or more principal mowers 124 includes one mower—the first mower 100A and the one or more secondary mowers 126 include two mowers—the second mower 100B and the third mower 100C.

The principal mower 124 and the secondary mowers 126 can communicate, e.g., using communication elements 110. In an embodiment, the principal mower 124 can communicate with the secondary mowers 126. More particularly, the principal mower 124 can communicate command instructions 128 to the secondary mowers 126. By way of non-limiting example, the command instructions 128 can include information associated with route selection, charging instructions, hierarchical decisions, or any combination thereof. As used herein, "route selection" is intended to refer to a selected (e.g., determined) route to be taken by one of the second mowers 100. Route selection may generally correspond with a path to be taken across the work area, e.g., during mowing operations, when moving while not mowing, etc. As used herein "charging instructions" may refer to instructions provided to the secondary mowers 100 to initiate charging protocols, such as to approach and enter a suitable charging location, e.g., a base station 112. As used herein "hierarchical decisions" may refer to decisions which are based on a hierarchy of the principal and/or secondary mowers 124 or 126. That is, for example, the principal mower 124 may supersede the secondary mowers 126 in route selection. In this way, the principal mower 124 can be kept from zones in the work area 120, e.g., where the principal mower 124 would likely lose communication with the base station 112. Hierarchical decisions may alternatively indicate which of the secondary mowers 126 is to perform a certain operation, such as which of the secondary mowers 126 is to operate in overlapping portions of the work area 120. Many other communications are contemplated herein without deviating from the scope of the disclosure.

In an embodiment, at least one of the secondary mowers 126 can communicate information 130 to the principal mower 124. The information being communicated from the at least secondary mower 126 to the principal mower 124 can include, for example, visual information captured by the sensor 102 of the at least secondary mower 126, a battery status indication of the at least one secondary mower 126, a satellite signal status of the at least one secondary mower 126, or any combination thereof.

In an embodiment, the principal mower 124 may store (or even process) at least a portion of the information 130 communicated from the secondary mower 126. In certain instances, the principal mower 124 may further communicate at least a portion 132 of the information 130 from the secondary mower 126 to the base station 112.

In certain instances, the base station 112 can utilize the information 130 to inform a decision about one or more aspects of the mowing operation. For example, if the information 130 relates to a low charge status of the secondary mower 126, the base station 112 may provide command instructions 134 to the secondary mower 126 to charge. In a particular embodiment, the base station 112 may instruct 134 the secondary mower 126 to go to a particular base station 112 to recharge. In a more particular embodiment, the base station 112 may instruct the secondary mower 126 to take a particular path to the particular base station 112. In a particular embodiment, these instructions 134 from the base station 112 to the secondary mower 126 may be communicated to the secondary mower 126 through the principal mower 124. That is, the principal mower 124 may act as a communication node between the secondary mowers 126 and the base station 112, or vice versa.

The base station 112 can generally include a processor 136 and a communication device 138. The processor 136 can be configured to generate command instructions 128, such as those described above. The communication device 138 can communicate the command instructions 128 to the secondary mowers 126, e.g., through the principal mower 124.

It should be noted that in accordance with an embodiment, the principal mower 124 may have no substantive difference from the secondary mowers 126 other than designation or differences not associated substantially with hierarchical decision making. So, for example, the principal and secondary mowers 124 and 126 can share a common design.

In certain instances, the mowers 100A, 100B, and 100C can swap designations. For example, one or more of the secondary mowers 126 (or one of the secondary mowers 126) can assume status of the principal mower 124 in response to certain operating events while the principal mower 126 can assume status of the secondary mowers 126. In this regard, the hierarchical schema between the principal and secondary mowers 124 and 126 can be dynamic, i.e., adjustable. For example, the operating event may be associated with a low battery level of the then-principal mower 124. In response, the then-principal mower 124 may assume a new status as a secondary mower 126 while one of the then-secondary mowers 126 becomes principal mower 124. This assumption of designation may continue indefinitely, until the occurrence of another operating event, or restore upon completion of a secondary operating event like the original principal mower 124 regaining sufficient charge to be redeployed into the work area 120. Other exemplary operating events which might trigger re-designation include getting stuck, jamming, obstacle encounters, machine damage or malfunctions, lost signals, high workload conditions which demand increased energy consumption and warrant switching principal designation to a secondary mower operating in lower workload conditions, or the like.

Figure 6:
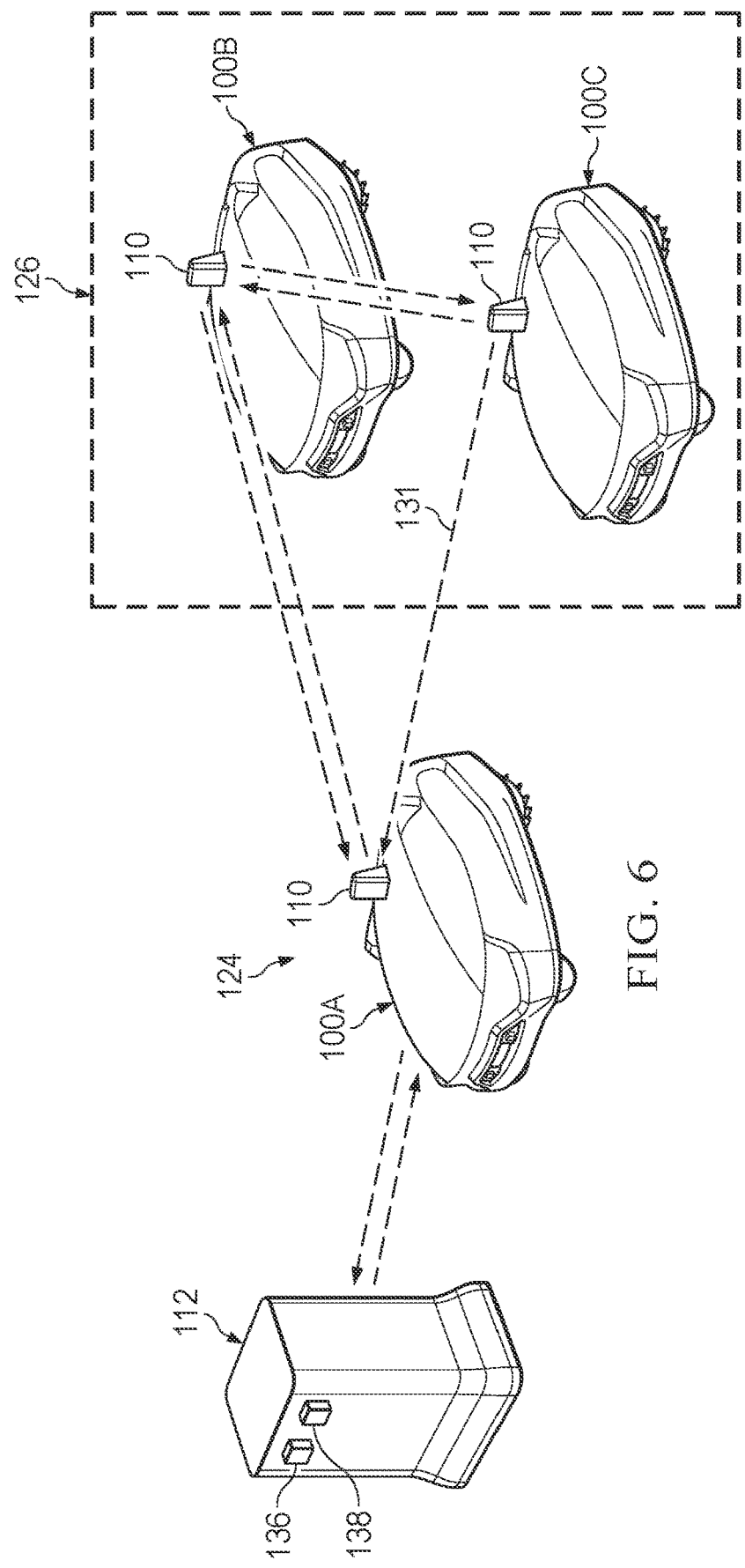
FIG. 6 is a schematic view of a hierarchical schema for a mowing system including a base station, a principal robotic lawn mower, and secondary robotic lawn mowers in accordance with an exemplary embodiment of the present disclosure.

FIG. 6 illustrates a hierarchical schema in accordance with another embodiment. In the hierarchical schema depicted in FIG. 6, the principal mower 124 includes the first mower 100A which communicates with only one of the secondary mowers 126, i.e., the second mower 100B. The second mower 100B communicates with the third mower 100C. The first mower 100A further communicates with the base station 112. In this regard, at least a portion of the communication between the base station 112 and third mower 100C goes through the first mower 100A and the second mower 100B.

In an embodiment, the third mower 100C may communicate with the first mower 100A, i.e., the principal mower 124, directly in one direction of communication. That is, for example, the third mower 100C may communicate at least some information 131 directly to the first mower 100A while only receiving command instructions from the second mower 100B.

Figure 7:
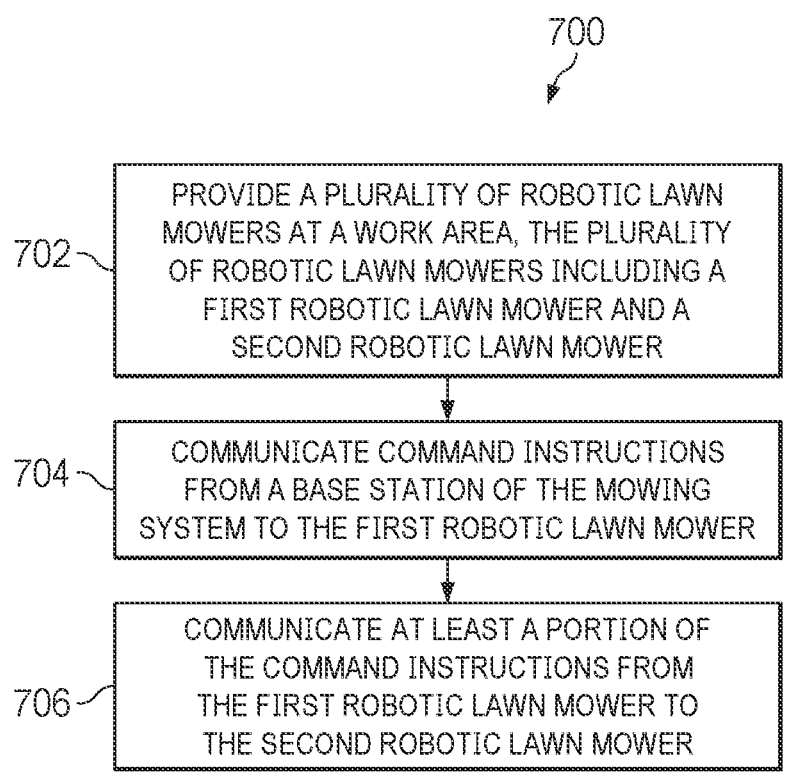
FIG. 7 is a flow chart of a method of operating a mowing system in accordance with an exemplary embodiment of the present disclosure.

FIG. 7 illustrates a flow chart of a method 700 of operating a mowing system in accordance with an exemplary embodiment. The method 700 can generally include a step 702 of providing a plurality of robotic lawn mowers at a work area. The plurality of robotic lawn mowers includes a first robotic lawn mower and a second robotic lawn mower. The method 700 can further include a step 704 of communicating command instructions from a base station of the mowing system to the first robotic lawn mower. The method 700 can further include a step 706 of communicating at least a portion of the command instructions from the first robotic lawn mower to the second robotic lawn mower.

The method 700 can further include a step of communicating information from the second robotic lawn mower to the first robotic lawn mower. The information may include information captured by the second robotic lawn mower about the second robotic lawn mower or the environment in which the second robotic lawn mower is disposed within. At least a portion of the information from the second robotic lawn mower can then be communication to the base station, e.g., from the first robotic lawn mower.

In an embodiment, the base station can generate command instructions for the robotic mowers. These command instructions can inform aspects of the operation of the mowing system. For example, the base station can generate command instructions in view of one or more aspects of the work area that position the first robotic mower within the work are at a location such that the first robotic lawn mower maintains communication with the plurality of robotic lawn mowers and with the base station. In this regard, the first robotic lawn mower can form a connection node for operation of the entire mowing system. Further, the number of signals generated at the base station may be reduced.

The first robotic lawn mower may analyze the command instructions sent from the base and send at least portions of the command instructions to the second robotic lawn mower. In certain instances, the first robotic lawn mower may further update the command instructions prior to communicating the command instructions to the second robotic mower. These updated command instructions may be updated, for example, in view of one or more factors known by the first robotic lawn mower but not known by the base station.

Further aspects of the disclosure are provided by one or more of the following embodiments:

Embodiment 1. A mowing system comprising: a base station disposed at a work area; and a plurality of robotic lawn mowers disposed at the work area, the plurality of robotic lawn mowers including a first robotic lawn mower and a second robotic lawn mower, wherein the base station is configured to communicate with the second robotic lawn mower through the first robotic lawn mower.

Embodiment 2. The mowing system of any one or more of the embodiments, wherein the base station comprises: a processor configured to generate a command instruction; and a communication device configured to communicate the command instruction to the second robotic lawn mower through the first robotic lawn mower.

Embodiment 3. The mowing system of any one or more of the embodiments, wherein the command instruction comprises information associated with route selection, charging instructions, hierarchical decisions, or any combination thereof.

Embodiment 4. The mowing system of any one or more of the embodiments, wherein the first robotic lawn mower comprises a principal robotic lawn mower and the second robotic lawn mower and any other robotic lawn mowers of the plurality of lawn mowers comprise secondary robotic lawn mowers, wherein the secondary robotic lawn mowers receive a command instruction from the principal robotic lawn mower.

Embodiment 5. The mowing system of any one or more of the embodiments, wherein at least one of the secondary robotic lawn mowers is configured to communicate information to the principal robotic lawn mower.

Embodiment 6. The mowing system of any one or more of the embodiments, wherein the information comprises visual information captured by a sensor of the at least one secondary robotic lawn mower, a battery status indication of the at least one secondary robotic lawn mower, a satellite signal status of the at least one secondary robotic lawn mower, or any combination thereof.

Embodiment 7. The mowing system of any one or more of the embodiments, wherein the principal robotic lawn mower is configured to communicate at least a portion of the information from the secondary robotic lawn mower to the base station.

Embodiment 8. The mowing system of any one or more of the embodiments, wherein the principal robotic lawn mower and the secondary robotic lawn mowers share a common design.

Embodiment 9. The mowing system of any one or more of the embodiments, wherein the principal robotic lawn mower assumes a status as one of the secondary robotic lawn mowers in response to an operating event and one of the secondary robotic lawn mowers assumes a status as the principal robotic lawn mower in response to the operating event.

Embodiment 10. The mowing system of any one or more of the embodiments, wherein the second robotic lawn mower and the base station are not in communication with each other.

Embodiment 11. The mowing system of any one or more of the embodiments, wherein the base station and each of the plurality of robotic lawn mowers form a network and communicate via a communication protocol.

Embodiment 12. The mowing system of any one or more of the embodiments, wherein the communication protocol comprises a Bluetooth Low Energy (BLE) protocol, a Zigbee protocol, Lange Range (LoRa) protocol, a radio-frequency protocol, or Wi-Fi.

Embodiment 13. The mowing system of any one or more of the embodiments, wherein the robotic lawn mowers communicate bidirectionally with each other, and wherein each of the plurality of robotic lawn mowers is configured to: determine a command for one of the other robotic lawn mowers based on data captured by a sensor; and provide the command to the one of the other robotic lawn mowers.

Embodiment 14. The mowing system of any one or more of the embodiments, wherein the robotic lawn mowers are connected to form a chain of robotic lawn mowers where data is unidirectionally transferred from the base station through the chain of robotic lawn mowers.

Embodiment 15. The mowing system of any one or more of the embodiments, wherein each of the plurality of robotic lawn mowers is configured to provide sensor data and location data to the other robotic lawn mowers.

Embodiment 16. The mowing system of any one or more of the embodiments, wherein the sensor data is captured by a sensor associated with the respective one of the plurality of robotic lawn mowers, and wherein the location data captured by a geolocation device associated with the respective one of the plurality of robotic lawn mowers.

Embodiment 17. The mowing system of any one or more of the embodiments, wherein each of the plurality of robotic lawn mowers is configured to: receive the sensor data and the location data from the other robotic lawn mowers, and process the sensor data and the location data to determine a map of the work area, determine a location for each of the other robotic lawn mowers, optimize a path through the work area, or avoid a collision with the other robotic lawn mowers.

Embodiment 18. The mowing system of any one or more of the embodiments, wherein the base station is configured to communicate with the second robotic lawn mower through the first robotic lawn mower when the second robotic lawn mower is out of a broadcast range of the base station.

Embodiment 19. The mowing system of any one or more of the embodiments, wherein the base station is configured to: send and receive communications from an external device, and provide and receive the communications from the second robotic lawn mower via the first robotic lawn mower.

Embodiment 20. The mowing system of any one or more of the embodiments, wherein the external device is a mobile device associated with a user.

Embodiment 11. A method of operating a mowing system, the method comprising: providing a plurality of robotic lawn mowers at a work area, the plurality of robotic lawn mowers including a first robotic lawn mower and a second robotic lawn mower; communicating command instructions from a base station of the mowing system to the first robotic lawn mower; and communicating at least a portion of the command instructions from the first robotic lawn mower to the second robotic lawn mower.

Embodiment 12. The method of any one or more of the embodiments, further comprising: communicating information from the second robotic lawn mower to the first robotic lawn mower; and communicating at least a portion of the information from the second robotic lawn mower to the base station.

Embodiment 13. The method of any one or more of the embodiments, further comprising generating the command instructions at the base station in view of one or more aspects of the work area such that the command instructions position the first robotic lawn mower within the work area such that the first robotic lawn mower maintains communication with the plurality of robotic lawn mowers and with the base station.

Embodiment 14. The method of any one or more of the embodiments, further comprising the first robotic lawn mower analyzing the command instructions and updating the command instructions prior to communicating at least a portion of the command instructions to the second robotic lawn mower.

Embodiment 15. The method of any one or more of the embodiments, wherein updating the command instructions is performed in view of one or more factors known by the first robotic lawn mower but not known by the base station.

Embodiment 16. The method of any one or more of the embodiments, further comprising, in response to an operating event, the base station switching communication from the first robotic lawn mower to the second robotic lawn mower such that, after switching communication from the first robotic lawn mower to the second robotic lawn mower, the base station communicates command instructions to the second robotic lawn mower and the second robotic lawn mower communicates at least a portion of the command instructions to the first robotic lawn mower.

Embodiment 17. The method of any one or more of the embodiments, wherein the first robotic lawn mower comprises a principal robotic lawn mower and the second robotic lawn mower and any other robotic lawn mowers of the plurality of lawn mowers comprise secondary robotic lawn mowers, and wherein the method further comprises, in response to an operating event, delegating principal robotic lawn mower operations to one of the secondary robotic lawn mowers.

Embodiment 18. The method of any one or more of the embodiments, further comprising, in response to the operating event reaching a threshold, returning principal robotic lawn mower operations to the first robotic lawn mower.

Embodiment 19. A mowing system comprising: a base station disposed at a work area; and a plurality of robotic lawn mowers disposed at the work area, the plurality of robotic lawn mowers including a first robotic lawn mower and a second robotic lawn mower arranged in a hierarchical schema.

Embodiment 20. The mowing system of any one or more of the embodiments, wherein the hierarchical schema comprises the first robotic lawn mower being a principal lawn mower and the second robotic lawn mower being a secondary robotic lawn mower, and wherein the principal lawn mower is configured to at least partially control the secondary robotic lawn mower.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Thus, embodiments described herein provide, among other things, a mowing system that include a base station and a plurality of robotic lawn mowers disposed in a work area. Various features and advantages are set forth in the following claims.

What is claimed is:

1. A mowing system comprising:
a base station disposed at a work area; and
a plurality of robotic lawn mowers disposed at the work area, the plurality of robotic lawn mowers including a first robotic lawn mower and a second robotic lawn mower, wherein the base station is configured to communicate with the second robotic lawn mower through the first robotic lawn mower,
wherein the first robotic lawn mower comprises a principal robotic lawn mower and the second robotic lawn mower comprises a secondary robotic lawn mower,
wherein the secondary robotic lawn mower receives a command instruction from the principal robotic lawn mower,
wherein the secondary robotic lawn mower is configured to communicate information to the principal robotic lawn mower, and
wherein the principal robotic lawn mower is configured to communicate at least a portion of the information from the secondary robotic lawn mower to the base station.

2. The mowing system of claim 1, wherein the base station comprises:
a processor configured to generate a command instruction; and
a communication device configured to communicate the command instruction to the second robotic lawn mower through the first robotic lawn mower.

3. The mowing system of claim 2, wherein the command instruction comprises information associated with route selection, charging instructions, hierarchical decisions, or any combination thereof.

4. The mowing system of claim 1, wherein the information comprises visual information captured by a sensor of the at least one secondary robotic lawn mower, a battery status indication of the at least one secondary robotic lawn mower, a satellite signal status of the at least one secondary robotic lawn mower, or any combination thereof.

5. The mowing system of claim 1, wherein the principal robotic lawn mower and the secondary robotic lawn mower share a common design.

6. The mowing system of claim 1, wherein the principal robotic lawn mower assumes a status as the secondary robotic lawn mower in response to an operating event and the secondary robotic lawn mower assumes a status as the principal robotic lawn mower in response to the operating event.

7. The mowing system of claim 1, wherein the second robotic lawn mower and the base station are not in communication with each other.

8. The mowing system of claim 1, wherein the base station and each of the plurality of robotic lawn mowers form a network and communicate via a communication protocol.

9. The mowing system of claim 8, wherein the communication protocol comprises a Bluetooth Low Energy (BLE) protocol, a Zigbee protocol, Long Range (LoRa) protocol, a radio-frequency protocol, or Wi-Fi.

10. The mowing system of claim 8, wherein the robotic lawn mowers communicate bidirectionally with each other, and wherein each of the plurality of robotic lawn mowers is configured to:
determine a command for one of the other robotic lawn mowers based on data captured by a sensor; and
provide the command to the one of the other robotic lawn mowers.

11. The mowing system of claim 8, wherein the robotic lawn mowers are connected to form a chain of robotic lawn mowers where data is unidirectionally transferred from the base station through the chain of robotic lawn mowers.

12. The mowing system of claim 8, wherein each of the plurality of robotic lawn mowers is configured to provide sensor data and location data to the other robotic lawn mowers.

13. The mowing system of claim 12, wherein the sensor data is captured by a sensor associated with the respective one of the plurality of robotic lawn mowers, and wherein the location data captured by a geolocation device associated with the respective one of the plurality of robotic lawn mowers.

14. The mowing system of claim 12, wherein each of the plurality of robotic lawn mowers is configured to:
receive the sensor data and the location data from the other robotic lawn mowers, and
process the sensor data and the location data to determine a map of the work area,
determine a location for each of the other robotic lawn mowers, optimize a path through the work area, or avoid a collision with the other robotic lawn mowers.

15. The mowing system of claim 1, wherein the base station is configured to communicate with the second robotic lawn mower through the first robotic lawn mower when the second robotic lawn mower is out of a broadcast range of the base station.

16. The mowing system of claim 1, wherein the base station is configured to:
send and receive communications from an external device, and
provide and receive the communications from the second robotic lawn mower via the first robotic lawn mower.

17. The mowing system of claim 16, wherein the external device is a mobile device associated with a user.

18. A method of operating a mowing system, the method comprising:
providing a plurality of robotic lawn mowers at a work area, the plurality of robotic lawn mowers including a first robotic lawn mower and a second robotic lawn mower;
communicating command instructions from a base station of the mowing system to the first robotic lawn mower;
communicating at least a portion of the command instructions from the first robotic lawn mower to the second robotic lawn mower;
communicating information from the second robotic lawn mower to the first robotic lawn mower; and
communicating at least a portion of the information from the second robotic lawn mower to the base station.

19. The method of claim 18, further comprising generating the command instructions at the base station in view of one or more aspects of the work area such that the command instructions position the first robotic lawn mower within the work area such that the first robotic lawn mower maintains communication with the plurality of robotic lawn mowers and with the base station.

20. The method of claim 18, further comprising the first robotic lawn mower analyzing the command instructions and updating the command instructions prior to communicating at least a portion of the command instructions to the second robotic lawn mower.

21. The method of claim 20, wherein updating the command instructions is performed in view of one or more factors known by the first robotic lawn mower but not known by the base station.

22. The method of claim 18, further comprising, in response to an operating event, the base station switching communication from the first robotic lawn mower to the second robotic lawn mower such that, after switching communication from the first robotic lawn mower to the second robotic lawn mower, the base station communicates command instructions to the second robotic lawn mower and the second robotic lawn mower communicates at least a portion of the command instructions to the first robotic lawn mower.

23. The method of claim 18, wherein the first robotic lawn mower comprises a principal robotic lawn mower and the second robotic lawn mower and any other robotic lawn mowers of the plurality of lawn mowers comprise secondary robotic lawn mowers, and wherein the method further comprises, in response to an operating event, delegating principal robotic lawn mower operations to one of the secondary robotic lawn mowers.

24. The method of claim 23, further comprising, in response to the operating event reaching a threshold, returning principal robotic lawn mower operations to the first robotic lawn mower.

25. A mowing system comprising:
a base station disposed at a work area; and
a plurality of robotic lawn mowers disposed at the work area, the plurality of robotic lawn mowers including a principal robotic lawn mower and a secondary robotic lawn mower arranged in a hierarchical schema, wherein the secondary robotic lawn mower receives a command instruction from the principal robotic lawn mower, and wherein the principal robotic lawn mower assumes a status as the secondary robotic lawn mower in response to an operating event and the secondary robotic lawn mower assumes a status as the principal robotic lawn mower in response to the operating event.

26. The mowing system of claim 25, wherein the hierarchical schema comprises the first robotic lawn mower being a principal lawn mower and the second robotic lawn mower being a secondary robotic lawn mower, and wherein the principal lawn mower is configured to at least partially control the secondary robotic lawn mower.

* * * * *